United States Patent
Koch et al.

(10) Patent No.: US 6,201,212 B1
(45) Date of Patent: Mar. 13, 2001

(54) PROCESS AND APPARATUS FOR THE CONTINUOUS WELDING OF GUIDED AND ABUTTED STRIPS OR PLATES BY MEANS OF A LASER BEAM

(75) Inventors: Martin Koch, Neukirchen-Vlyn; Steffen Thiem, Hünxe; Manfred Zeimes, Hilden, all of (DE)

(73) Assignee: Thyseen Stahl AG, Duisburg (DE)

( * ) Notice: Subject to any disclaimer, the term of this patent is extended or adjusted under 35 U.S.C. 154(b) by 0 days.

(21) Appl. No.: 09/380,218

(22) PCT Filed: Feb. 13, 1998

(86) PCT No.: PCT/EP98/00841

§ 371 Date: Aug. 27, 1999

§ 102(e) Date: Aug. 27, 1999

(87) PCT Pub. No.: WO98/38003

PCT Pub. Date: Sep. 3, 1998

(30) Foreign Application Priority Data

Feb. 28, 1997 (DE) ................................ 197 08 047

(51) Int. Cl.⁷ .................................................. B23K 26/14
(52) U.S. Cl. ................................ 219/121.63; 219/121.84
(58) Field of Search ........................ 219/121.63, 121.64, 219/121.84

(56) References Cited

U.S. PATENT DOCUMENTS

| | | | |
|---|---|---|---|
| 3,629,546 | * 12/1971 | Fry .................................. | 219/121.84 |
| 4,127,761 | * 11/1978 | Pauley et al. .................... | 219/121.84 |
| 4,990,741 | * 2/1991 | Moores et al. ................... | 219/121.64 |
| 5,902,497 | * 5/1999 | Alber et al. ...................... | 219/121.63 |

FOREIGN PATENT DOCUMENTS

| | | | |
|---|---|---|---|
| 195 37 924 A1 | 5/1996 | (DE) . | |
| 6-297173 | * 10/1994 | (JP) . | |
| 9-295011 | * 11/1997 | (JP) . | |

OTHER PUBLICATIONS

SU 1824268A (Ashirbekov et al.) Jun. 30, 1993 (abstract) WPI, Derwent Pub. Ltd., London GB AN 94–364758.

* cited by examiner

*Primary Examiner*—Samuel M. Heinrich
(74) *Attorney, Agent, or Firm*—Proskauer Rose LLP

(57) ABSTRACT

A process and apparatus for continuous welding by a laser beam of guided and abutted strips or plates which lie in a plane comprises supplying a follow-up process gas to a welding location and thereafter, cooling the welding location by applying a sprayed-on coolant to an area adjacent to the welding location. The coolant comprises a mixture of water and gas, and is sprayed onto the strips or plates in the form of a flat jet. The flat jet extends towards the welding location and lies in a plane perpendicular to the plane of the strips or plates. The leading edge of the flat jet forms an acute angle with the laser beam.

9 Claims, 2 Drawing Sheets

PROCESS AND APPARATUS FOR THE CONTINUOUS WELDING OF GUIDED AND ABUTTED STRIPS OR PLATES BY MEANS OF A LASER BEAM

BACKGROUND OF THE INVENTION

The invention relates to a process for the continuous welding of guided and abutted strips or plates, using a laser beam to which follow-up process gas is supplied at the welding location, the weld being cooled with a sprayed-on coolant adjacent to the location of welding.

The invention also relates to an apparatus for the continuous welding of guided and abutted strips or plates, using guiding and conveying means and also a fixed laser radiator which is followed in the conveying direction of the strips or plates by a nozzle arrangement having a process gas nozzle directed at the welding point and a coolant nozzle directed at the immediate surroundings of the location of welding.

Processes for the laser beam continuous welding of guided and abutted strips or plates are known (DE 195 37 924 A1; EP 0 450 349 B1).

In one of these prior art devices (DE 195 37 294 A1) three nozzles are disposed one after the other in the conveying direction of the strips, protective gas being supplied to the welding location via a first nozzle. Inert gas is blown on to the weld via a following nozzle. The weld is acted upon by a liquid coolant via a third nozzle. The inert gas of the second nozzle and the liquid coolant are directed away from the welding location at a certain angle. In practice the inert gas of the second nozzle produces a gas curtain which screens the welding location from the coolant.

Such an apparatus is expensive, since it requires three separate supply lines for gas and coolant. Another disadvantage is that in view of the given geometrical relationships with the three nozzles, cooling cannot start very close to the welding location. Nor can the relationships be simply altered in dependence on the process. Corrosion can be prevented only if after cooling the liquid coolant is removed by suction from the strip surface. This requires an expensive suctional removal device.

In the other known apparatus (EP 0 450 349 B1) the cooling nozzle consists of a cooling plate having a plurality of nozzle openings, and a beak which also has a plurality of nozzle openings and extends as far as adjacent the welding location. In this case, air is blown on as coolant over the nozzle apertures. Quite apart from the very expensive construction of this cooling plate, experience shows that particularly intensive cooling cannot be achieved using air.

A more intensive cooling of the welding place is supposed to be obtained by means of a gas/liquid coolant mixture applied by nozzle (SU 18 24 268 A1).

It is an object of the invention to provide a process and an apparatus for the continuous welding of guided and abutted strips or plates using a laser beam, said process and apparatus enabling the weld to be intensively cooled using comparatively simple means.

SUMMARY OF THE INVENTION

In the process according to the invention this problem is solved by the features that the coolant used is a water and gas mixture in the form of a flat jet which extends in the direction of the weld and lies in a plane standing perpendicular to the plane of the strip or plate and whose leading edge, extending in the direction of the laser beam, encloses an acute angle with the laser beam.

In the apparatus according to the invention the solution is that the coolant nozzle is a slot jet nozzle for a water and gas mixture whose flat jet lies in a plane which stands perpendicular to the plane of the strip or plate, extends along the weld and by its front edge encloses an acute angle with laser beam.

In comparison with the prior art the invention produces a substantially improved and more readily controllable intensity by the fact that not only gas and air or water is used as the coolant, but a mixture of gas and water. For this purpose only one further nozzle is required in addition to the nozzle for the process gas, since the welding place need not be screened off from the coolant by inert gas. Since the water is supplied in the form of droplets, substantially better use is made of the cooling effect than in the case of a full jet of liquid. The physical explanation of this cooling effect is probably that the sprayed-on droplets pierce a vapor layer forming on the sheet, so that they make direct contact with the weld to be cooled and possibly its surroundings. Experience has shown that, in comparison with cooling exclusively using water and air, the same cooling effect can be achieved with only a fraction of $1/10$ in the case of water and a fraction of $1/40$ in the case of air. This improved cooling effect is also to be ascribed to the fact that use of the flat jet limits the cooling effect substantially to the zone of the weld. The special geometry of the flat jet, whose front edge encloses an acute angle with the laser beam and can preferably be effected by a trapezoidal widening of the jet, ensures that cooling is started immediately adjacent the welding point. Because of the early start of cooling, welding speed can be increased and productivity thereby improved. The start of cooling can be changed by pivoting the nozzle in the plane of the weld, with an unchanged distance between the nozzle and the plate. However, the cooling of plates can also be changed with an unchanged angular position of the nozzle, by changing the distance horizontally or vertically. Since no large volume of liquid coolant is supplied, there is no adverse effect on welding quality due to the cooling starting immediately adjacent the welding point. Neither is any expensive suctional removal required.

One advantageous feature of the invention has been found to be that the weld surface acted upon by the flat beam has a length-to-width ratio of 1:5 to 1:30. It has also been found to be advantageous if the mass flow ratio of the water and gas mixture is 0.1 to 3, preferably 0.5. This mass flow ratio can be maintained in various ways, for example, it can be provided by the nozzle itself, but can also be varied via the delivery pressure and delivery speed of the two associates, water and air.

The slot jet nozzle preferably takes the form of an injector nozzle. Operation has been found to be very reliable if the slot jet nozzle is a pin-shaped mouthpiece with a chamfered end face edge and an end face slot extending as far as the edge.

BRIEF DESCRIPTION OF THE DRAWINGS

An embodiment of the invention will now be explained in greater detail with reference to the drawings, which show.

DETAILED DESCRIPTION OF THE INVENTION

Figure 1:
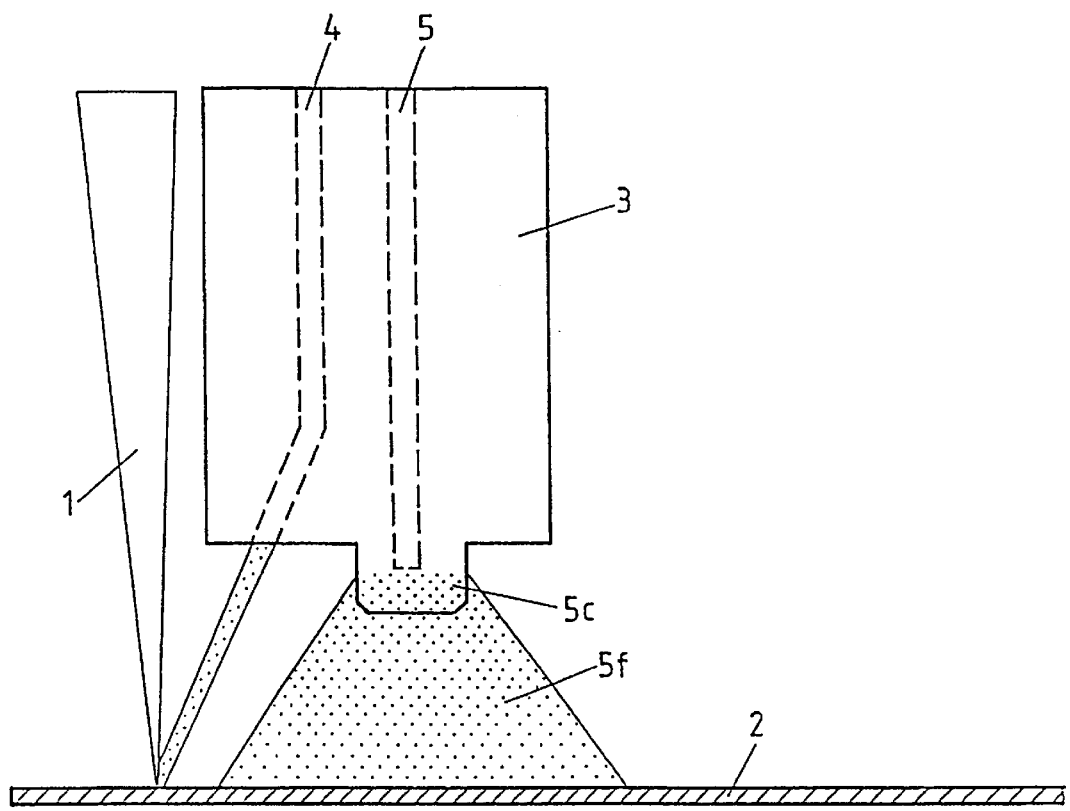
FIG. 1 a diagrammatic side elevation of an apparatus for the continuous welding of guided and abutted strips or plates, FIG. 2 a side elevation of a nozzle arrangement with process nozzle and slot jet nozzle of the apparatus in FIG. 1, FIG. 3 a rear view of the slot jet nozzle shown in FIG. 2, and FIG. 4 the slot jet nozzle shown in FIG. 2, axially sectioned along the line A—A in FIG. 2.
Figure 2:
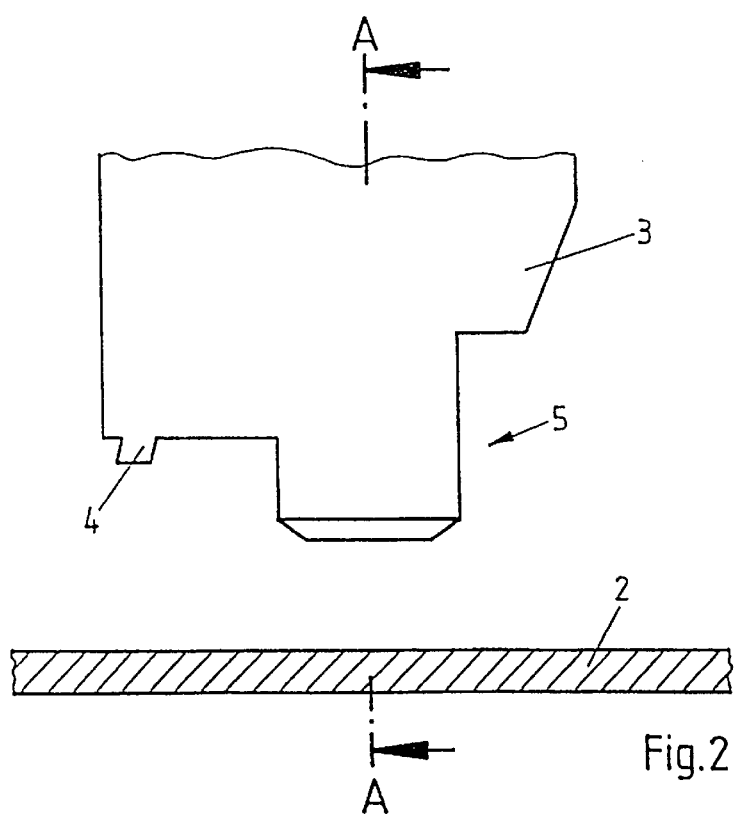
Figure 3:
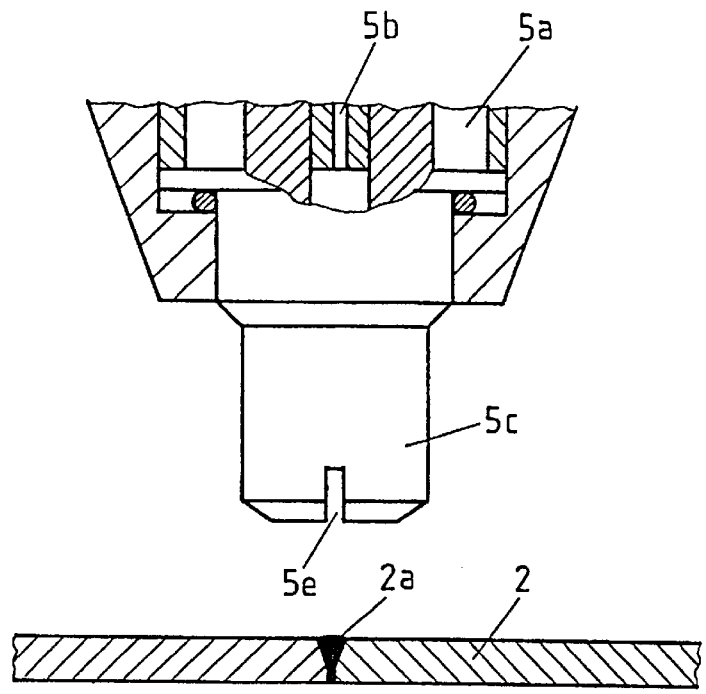
Figure 4:
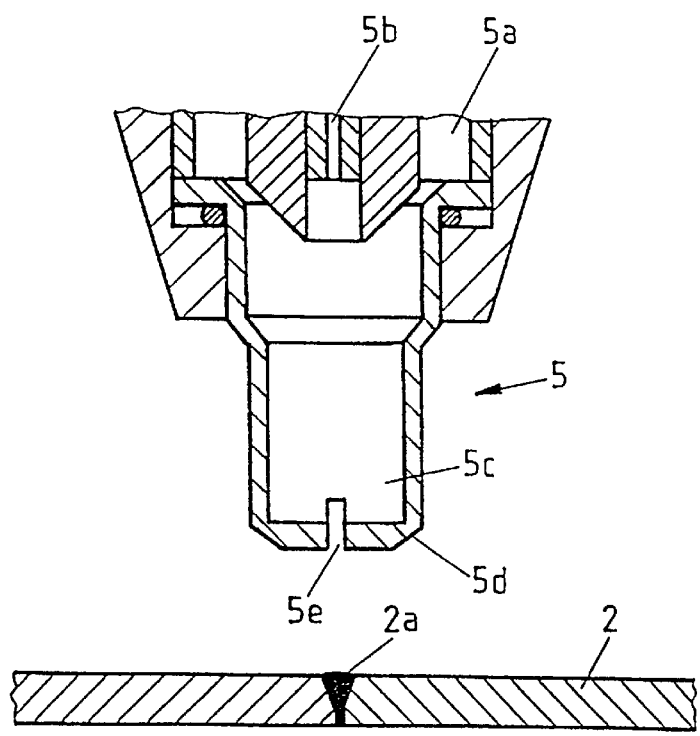

The presentation of the apparatus in FIG. 1 extends through the weld. A laser beam 1 is directed perpendicularly at plates 2 to be welded to one another with an end joint 2*a* and guided by conveying and guiding means (not shown). In the welding direction the laser beam 1 is followed by a nozzle arrangement 3 which takes the form of a duplex nozzle and has a first nozzle 4 for process gas with an inclined delivery direction. The process gas is supplied to the welding point. A second nozzle 5 for a water and air mixture follows the first nozzle 4.

The nozzle 5 takes the form of a pneumatic atomizer nozzle with internal mixing. The nozzle has an annular channel 5*a* for air and a central channel 5*b* for water. Water and air are eddied in the cylindrical mouthpiece of the nozzle. The end face of the mouthpiece 5*c* has a chamfered edge 5*d* with a narrow end face slot 5*e* which extends into the zone of the chamfer.

This construction of the slot jet nozzle 5 enables the trapezoidally widening flat jet 5*f* to emerge from the slot 5*e* and extend in the direction of the weld 2*a*. Due to the opening angle, the flat jet 5*f* extends to adjacent the welding point. The distance between the welding point and the start of cooling can be reduced by enlarging the opening angle. However, the said distance can also be varied by changing the distance of the nozzle 5 from the plate 2 or by displacing the nozzle 5 parallel with the plate surface and in the direction of the weld. The distance between the welding point and the start of cooling can also be varied by pivoting the nozzle 5 around a pivoting axis lying transversely of the weld 2*a* and parallel with the plate 2.

In combination with the slot jet nozzle it is also possible to use another nozzle shape, to approach as close as possible to the welding place. For example, nozzles can be used which also cool the plate upstream of and alongside the welding place. Such cooling also makes sense, to counteract any tendency of the abutting edges to move apart or over one another. However, such cooling is also useful inasmuch as it prevents the welding heat from expanding far into the plate. The fact is that in the case of coated plates, more particularly galvanized plates, an attempt is made to ensure that the laser beam vaporizes as little zinc as possible alongside the weld, to make use of the electrolytic protection effect of the remaining zinc on the weld. A ring jet nozzle, for example, is suitable for these purposes. The ring jet of such a ring jet nozzle performs an additional cooling of the plate upstream of and alongside the welding place.

What is claimed is:

1. A process for continuous welding by a laser beam of guided and abutted strips or plates lying in a plane, the method comprising the steps of:

supplying a follow-up process gas to a welding location, and cooling the welding location by applying a sprayed-on coolant to an area which is adjacent to the welding location, wherein the coolant comprises a mixture of water and gas which is sprayed onto the strips or plates in the form of a flat jet which extends towards of the welding location, the flat jet lying in a plane which is perpendicular to the plane of the strips or plates, the flat jet having a leading edge which forms an acute angle with the laser beam.

2. The process of claim 1 wherein the flat jet is in the form of a trapezoid which widens in the direction of the laser beam.

3. The process of claim 1 wherein the flat jet acts upon a weld surface of the strips or plates having a length to width ratio in the range of 1:5 to 1:30.

4. The process of claim 1 wherein the mass ratio of the water to gas in the coolant is in the range of 0.1 to 3.

5. The process of claim 4 wherein the mass ratio of the water to gas in the coolant is 0.5.

6. An apparatus for continuous welding of guided and abutted strips or plates comprising:

guiding and conveying means for guiding and conveying the strips or plates, a fixed laser radiator, a nozzle arrangement which supplies a process gas at a welding location, and a coolant nozzle which supplies a coolant to an area which is adjacent to the welding location, wherein the coolant comprises a mixture of water and gas, and wherein the coolant nozzle is a slot jet nozzle which sprays the coolant in the form of a flat jet, which lies in a plane perpendicular to the plane of the strips or plates and which has a leading edge which forms an acute angle with the laser beam.

7. The apparatus of claim 6 wherein the flat jet is in the form of a trapezoid which widens from the slot jet nozzle to the plane of the strips or plates.

8. The apparatus of claim 6 wherein the slot jet nozzle comprises a pneumatic atomizer nozzle with internal mixing.

9. The apparatus of claim 6 wherein the slot jet nozzle has a pin-shaped mouthpiece with a chamfered end face edge and an edge face slot which extends to the end face edge.

* * * * *